United States Patent
Kim et al.

(10) Patent No.: US 10,992,038 B2
(45) Date of Patent: Apr. 27, 2021

(54) METHOD AND APPARATUS FOR CALIBRATING ARRAY ANTENNA SYSTEM FOR PHASE COMPENSATION

(71) Applicant: Electronics and Telecommunications Research Institute, Daejeon (KR)

(72) Inventors: Chung Sup Kim, Daejeon (KR); hyuk Je Kim, Daejeon (KR); Jong Soo Lim, Daejeon (KR); Ju Yeon Hong, Daejeon (KR); Young Jun Chong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/703,154

(22) Filed: Dec. 4, 2019

(65) Prior Publication Data

US 2021/0075101 A1 Mar. 11, 2021

(30) Foreign Application Priority Data

Sep. 10, 2019 (KR) .................. 10-2019-0111968

(51) Int. Cl.
| | | |
|---|---|---|
| *H04B 17/21* | (2015.01) | |
| *H01Q 21/22* | (2006.01) | |
| *H01Q 3/26* | (2006.01) | |
| *H04L 27/26* | (2006.01) | |
| *H04B 17/336* | (2015.01) | |

(52) U.S. Cl.
CPC .............. *H01Q 3/267* (2013.01); *H01Q 21/22* (2013.01); *H04B 17/21* (2015.01); *H04B 17/336* (2015.01); *H04L 27/2647* (2013.01)

(58) Field of Classification Search
CPC ........ H01Q 21/22; H01Q 3/267; H04B 17/21; H04B 17/11; H04B 17/336; H04L 27/2647
See application file for complete search history.

(56) References Cited

U.S. PATENT DOCUMENTS

| | | | |
|---|---|---|---|
| 6,321,071 B1 * | 11/2001 | Pekkarinen ............ | H04B 17/17 455/115.2 |
| 10,484,038 B1 * | 11/2019 | Kimball ................... | H04B 1/44 |
| 2009/0315774 A1 | 12/2009 | Son et al. | |

(Continued)

FOREIGN PATENT DOCUMENTS

| | | |
|---|---|---|
| KR | 101543242 B1 | 8/2015 |
| KR | 101727600 B1 | 5/2017 |
| KR | 101953356 B1 | 2/2019 |

*Primary Examiner* — Aristocratis Fotakis
(74) *Attorney, Agent, or Firm* — William Park & Associates Ltd.

(57) ABSTRACT

A method and apparatus for calibrating a phased array antenna system is disclosed. The method includes receiving a first transmission signal transmitted from a transmitting antenna device, receiving a second transmission signal that is generated by the transmitting antenna device based on an unoccupied frequency band of a receiving array antenna system and a bandwidth of the frequency band, and generating a calibration matrix to calibrate a plurality of antenna elements included in the receiving array antenna system based on a signal magnitude and a phase difference which are calculated for each of the antenna elements using the first transmission signal and the second transmission signal.

18 Claims, 14 Drawing Sheets

(56) References Cited

U.S. PATENT DOCUMENTS

| | | | |
|---|---|---|---|
| 2014/0242914 A1* | 8/2014 | Monroe | H04B 17/21 |
| | | | 455/63.4 |
| 2015/0124634 A1* | 5/2015 | Harel | H04W 24/08 |
| | | | 370/252 |
| 2018/0159640 A1* | 6/2018 | Taher | H04L 25/0204 |
| 2018/0294564 A1 | 10/2018 | Kim | |
| 2019/0222406 A1* | 7/2019 | Wang | H04L 25/0224 |
| 2019/0227144 A1* | 7/2019 | Lin | G01S 13/88 |
| 2019/0349048 A1* | 11/2019 | Huang | H04B 7/08 |
| 2020/0014105 A1* | 1/2020 | Braun | H04B 17/21 |

\* cited by examiner

10

200

FIG. 13
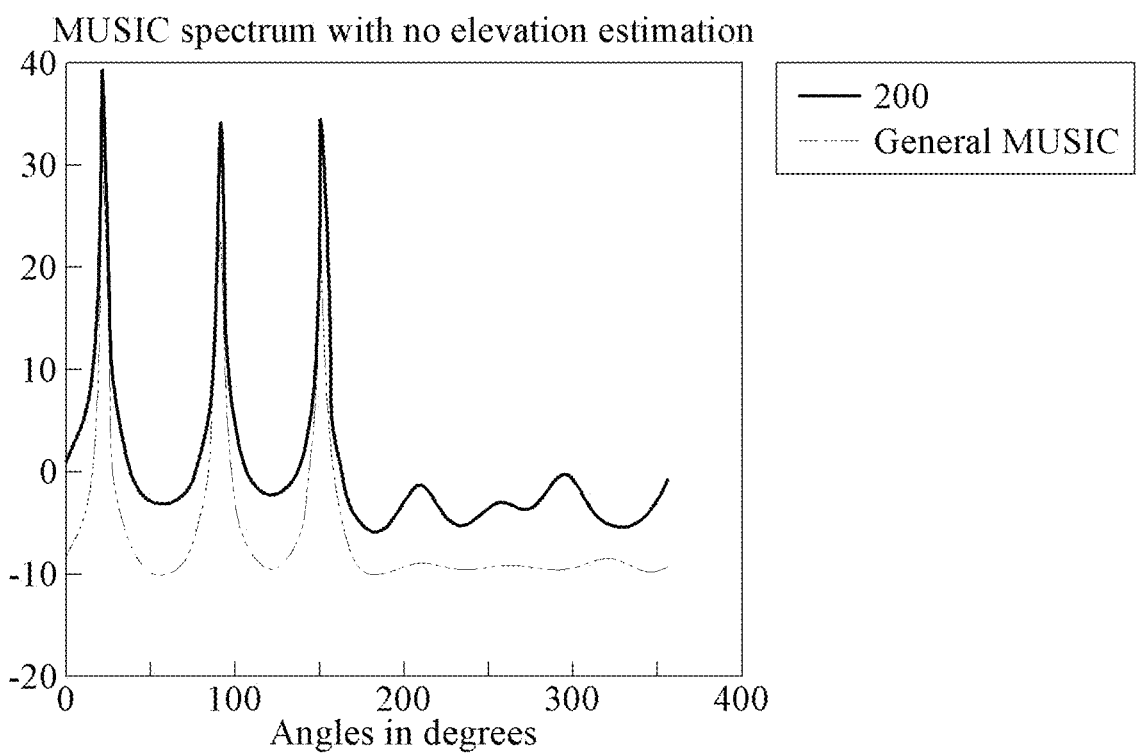
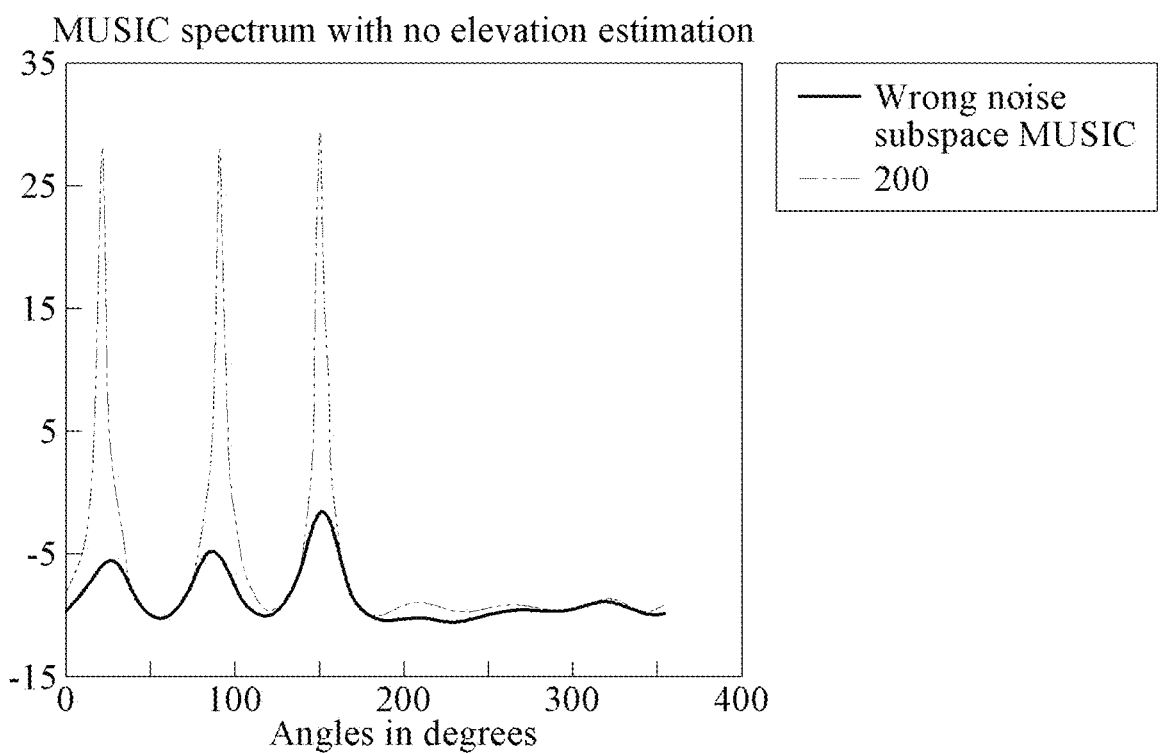

METHOD AND APPARATUS FOR CALIBRATING ARRAY ANTENNA SYSTEM FOR PHASE COMPENSATION

CROSS-REFERENCE TO RELATED APPLICATION(S)

This application claims the priority benefit of Korean Patent Application No. 10-2019-0111968 filed on Sep. 10, 2019, in the Korean Intellectual Property Office, the disclosure of which is incorporated herein by reference for all purposes.

BACKGROUND

1. Field

One or more example embodiments relate to a method and apparatus for calibrating an array antenna system for phase compensation of the array antenna system.

2. Description of Related Art

In general, an existing linear array antenna system may arrange a phase for each antenna element therein to maximize a gain and minimize side-lob power or similar pattern characteristics. In contrast, a massive array antenna system used for LTE and 5G may perform an algorithm at a signal quality level to obtain phase consistency between various received signals and remove an obstacle.

However, in the linear array antenna system, antenna elements may be degraded as time elapses, and thus a value of an initial calibration matrix performed when the linear array antenna system is installed may change. When the value of the initial calibration matrix changes, the linear array antenna system may need to suspend an operation to adjust the changed value of the initial calibration matrix, and perform calibration on the antenna elements after being moved to a location suitable for the system calibration. Thus, for the calibration, the system operation may need to be suspended for a predetermined period of time, and an additional calibration operation may be required for the entire system to calibrate an external environment event after the calibration is performed on an array antenna.

To solve such an issue, an inverse beamforming (IBF) function may be provided in the linear array antenna system, and a test may be performed on the antenna elements during the system operation. However, such addition of the IBF function to the linear array antenna system may make the system more complicated in structure and increase the cost for installing an additional circuit.

In addition, even with the addition of the IBF function to the linear array antenna system, additional calibration may be required for an external antenna. Further, even by performing the test with an external transmission system, it may not be easy to calibrate an antenna element normally in a multipath environment. Furthermore, when the linear array antenna system transmits a signal with great power, it may be an obstacle to a real-time operation. In contrast, when the linear array antenna system transmits a signal with small power, it may not be easy to calibrate an antenna element.

The massive array antenna system used for LTE and 5G may use a method of performing an algorithm optimized for an operation, and continuously compensating for a portion of antenna elements degraded in performance. Thus, the massive array antenna system may have increased complexity of a compensation algorithm for maintaining performance, compared to a calibration method performed by the linear array antenna system.

In addition, the massive array antenna system may not readily deal with the degradation of the antenna elements through the algorithm. To deal with the degradation of the antenna elements, an IBF function may be added to the massive array antenna system. However, such addition of the IBF function to the massive array antenna system may require an additional divider or coupler and increase complexity in internal structure. Further, the addition of the IBF function may enable calibration of the system excluding the antenna elements. Thus, the massive array antenna system may need to perform additional calibration on the antenna elements in addition to an external environment.

SUMMARY

An aspect provides a method and apparatus that may calibrate a plurality of antenna elements based on an unoccupied frequency band of a receiving array antenna system and a bandwidth of the frequency band, and thus reduce an internal complexity of the receiving array antenna system. The calibrating may be performed during an operation of the system.

According to an example embodiment, there is provided a method of calibrating a phased array antenna system, the method including receiving a first transmission signal transmitted from a transmitting antenna device, receiving a second transmission signal that is generated by the transmitting antenna device based on an unoccupied frequency band of a receiving array antenna system and a bandwidth of the frequency band, and generating a calibration matrix to calibrate a plurality of antenna elements included in the receiving array antenna system based on a signal magnitude and a phase difference which are calculated for each of the antenna elements using the first transmission signal and the second transmission signal.

The receiving may include receiving the first transmission signal and the second transmission signal at an incidence angle perpendicular to a receiving azimuth angle of the antenna elements.

The method may further include determining a pseudo noise (PN) code length and a chip rate based on a center frequency of the frequency band and the bandwidth, and generating the second transmission signal based on the determined PN code length and the determined chip rate.

The method may further include monitoring the center frequency of the frequency band and the bandwidth.

The determining of the PN code length and the chip rate may include determining, to be the chip rate, at least one orthogonal frequency-division multiplexing (OFDM) channel bandwidth using a guard band included in the bandwidth.

The first transmission signal and the second transmission signal may be signals for which a signal-to-interference-plus-noise ratio (SINR) is set to be 0 decibels (dB) equal to an average power of an OFDM channel band using the guard band and to be transmitted.

The generating may include performing digital down-conversion on the first transmission signal and the second transmission signal to convert the frequency band and the bandwidth to a baseband, generating a correlation value using a first transmission signal and a second transmission signal which are obtained through the digital down-conversion, calculating a signal magnitude and a phase difference for each of the antenna elements based on the generated correlation value, and generating a calibration matrix for an antenna element having a phase difference being greater than or equal to a first threshold value among the antenna elements based on the calculated signal magnitude and phase difference.

When the bandwidth is greater than or equal to a second threshold value, the calculating of the signal magnitude and the phase difference may include calculating steering vectors corresponding to line of sight (LoS) transmission based on a signal received at a point on an LoS path in a delay time domain of the second transmission signal, and calculating the signal magnitude and the phase difference based on the calculated steering vectors.

The LoS path may be a path having a greatest magnitude of the second transmission signal and a shortest arrival time of the second transmission signal in the delay time domain of the second transmission signal.

When the bandwidth is less than the second threshold value, the calculating of the signal magnitude and the phase difference may include estimating the number of multipath for the second transmission signal, calculating eigenvectors formed in a transmission direction of the second transmission signal based on the number of the multipath, and calculating the signal magnitude and the phase difference based on the calculated eigenvectors.

According to another example embodiment, there is provided an apparatus for calibrating a phased array antenna system, the apparatus including a memory configured to store instructions for calibrating the phased array antenna system, and a processor configured to execute the instructions. When the instructions are executed by the processor, the processor may be configured to receive a first transmission signal transmitted from a transmitting antenna device, receive a second transmission signal that is generated by the transmitting antenna device based on an unoccupied frequency band of a receiving array antenna system and a bandwidth of the frequency band, and generate a calibration matrix to calibrate a plurality of antenna elements included in the receiving array antenna system based on a signal magnitude and a phase difference which are calculated for each of the antenna elements using the first transmission signal and the second transmission signal.

The processor may be configured to receive the first transmission signal and the second transmission signal at an incidence angle perpendicular to a receiving azimuth angle of the antenna elements.

The processor may be configured to determine a PN code length and a chip rate based on a center frequency of the frequency band and the bandwidth, and generate the second transmission signal based on the determined PN code length and the determined chip rate.

The processor may be configured to monitor the center frequency of the frequency band and the bandwidth.

The processor may be configured to determine, to be the chip rate, at least one OFDM channel bandwidth using a guard band included in the bandwidth.

The first transmission signal and the second transmissions signal may be signals for which a SINR is set to be 0 dB equal to an average power of an OFDM channel band using the guard band and to be transmitted.

The processor may be configured to perform digital down-conversion on the first transmission signal and the second transmission signal to convert the frequency band and the bandwidth to a baseband, generate a correlation value using a first transmission signal and a second transmission signal which are obtained through the digital down-conversion, calculate a signal magnitude and a phase difference for each of the antenna elements based on the generated correlation value, and generate a calibration matrix for an antenna element having a phase difference being greater than or equal to a first threshold value among the antenna elements based on the calculated signal magnitude and the calculated phase difference. When the bandwidth is greater than or equal to a second threshold value, the processor may be configured to calculate steering vectors corresponding to LoS transmission based on a signal received at a point on an LoS path in a delay time domain of the second transmission signal, and calculate the signal magnitude and the phase difference based on the calculated steering vectors.

The LoS path may be a path having a greatest magnitude of the second transmission signal and a shortest arrival time of the second transmission signal in the delay time domain of the second transmission signal.

When the bandwidth is less than the second threshold value, the processor may be configured to estimate the number of multipath for the second transmission signal, calculate eigenvectors formed in a transmission direction of the second transmission signal based on the estimated number of the multipath, and calculate the signal magnitude and the phase difference based on the calculated eigenvectors.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which:

FIG. 13 is a diagram illustrating an example of how a receiving array antenna system estimates the number of multipath according to an example embodiment.

DETAILED DESCRIPTION

Figure 1:
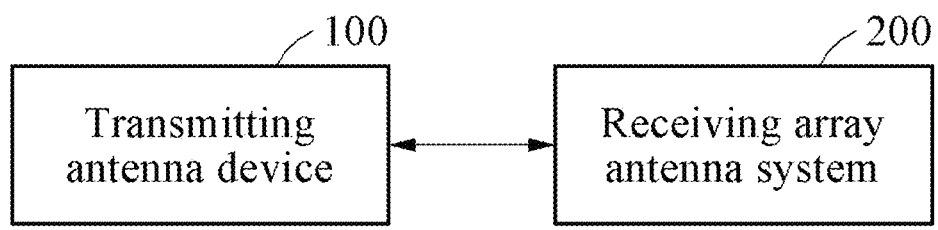
FIG. 1 is a diagram illustrating an example of a communication system according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a diagram illustrating an example of a communication system according to an example embodiment.

Referring to FIG. 1, a communication system 10 includes a transmitting antenna device 100 and a receiving array antenna system 200.

The communication system 10 may perform calibration and phase compensation on a plurality of antenna elements included in an array antenna system based on an unoccupied frequency band and a bandwidth. The communication system 10 may perform the calibration and the phase compensation on the antenna elements, while continuously maintaining an operation of the array antenna system without an inclusion of an additional circuit having an inverse beamforming (IBF) function. Thus, the communication system 10 may be effective in reducing structural complexity, and be more cost-effective without a need to install the additional circuit.

The transmitting antenna device 100 generates a first transmission signal. The transmitting antenna device 100 transmits the generated first transmission signal to the receiving array antenna system 200. For example, the first transmission signal may be a test signal for communication with the receiving array antenna system 200. The transmitting antenna device 100 monitors an unoccupied frequency band of the receiving array antenna system 200, for example, a center frequency of the frequency band, and a bandwidth, while exchanging the first transmission signal with the receiving array antenna system 200. Herein, the bandwidth may indicate a bandwidth of the unoccupied frequency band of the receiving array antenna system 200.

The transmitting antenna device 100 determines a pseudo noise (PN) code length and a chip rate based on the center frequency of the frequency band and the bandwidth. For example, the transmitting antenna device 100 determines, to be the chip rate, at least one orthogonal frequency-division multiplexing (OFDM) channel bandwidth using a guard band included in the bandwidth. The transmitting antenna device 200 may set, to be the chip rate, a difference between a 20 megahertz (MHz) bandwidth allocated to an 802.11 OFDM signal and an occupied bandwidth of 16.6 MHz bandwidth.

The transmitting antenna device 100 generates a second transmission signal based on the PN code length and the chip rate. The transmitting antenna device 100 transmits the generated second transmission signal to the receiving array antenna system 200. For example, the transmitting antenna device 100 transmits the first transmission signal and/or the second transmission signal by setting a signal-to-interference-plus-noise ratio (SINR) to be 0 decibels (dB) which is equal to an average power of an OFDM channel band using the guard band.

The receiving array antenna system 200 generates a calibration matrix to calibrate a plurality of antenna elements included in the receiving array antenna system 200 based on the first transmission signal and the second transmission signal. The receiving array antenna system 200 performs calibration and phase compensation on the antenna elements included in the receiving array antenna system 200 based on the calibration matrix.

The receiving array antenna system 200 receives and/or transmits the first transmission signal and/or the second transmission signal from and/or to the transmitting antenna device 100. For example, the receiving array antenna system 200 may be located such that a signal transmitted from the transmission antenna device 100 is received and/or transmitted at an incidence angle perpendicular to a receiving azimuth angle of the antenna elements.

Figure 2:
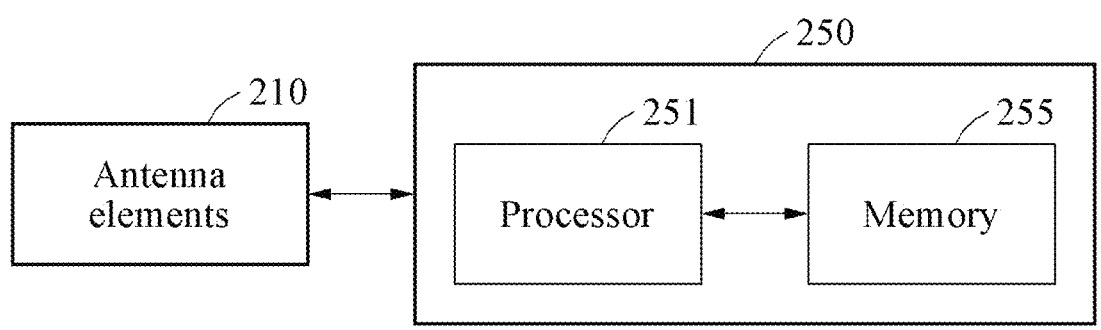
FIG. 2 is a diagram illustrating an example of a receiving array antenna system of FIG. 1.

FIG. 2 is a diagram illustrating an example of the receiving array antenna system 200 of FIG. 1.

Referring to FIG. 2, the receiving array antenna system 200 includes a plurality of antenna elements 210 and a calibration device 250.

The antenna elements 210 receive and transmit a first transmission signal and/or second transmission signal. For example, the antenna elements 210 may receive and transmit the first transmission signal and/or the second transmission signal at an incidence angle perpendicular to a receiving azimuth angle of the antenna elements 210.

The antenna elements 210 transmit, to the calibration device 250, the first transmission signal and/or the second transmission signal.

The calibration device 250 includes a processor 251 and a memory 255.

The processor 251 may include at least one of a central processing unit (CPU), an application processor, or a communication processor.

The processor 251 may perform an operation to control at least one of other components of the calibration device 250, or data processing. For example, the processor 251 may execute an application and/or software stored in the memory 255.

The processor 251 may process a signal received by the antenna elements 210 and data stored in the memory 255. The processor 251 may process data stored in the memory 255. The processor 251 may execute a computer-readable code, for example, software, that is stored in the memory 255, and instructions derived by the processor 251.

The processor 251 may be a data processing device embodied by hardware having a circuit of a physical structure to execute desired operations. The desired operations may include, for example, a code included in a program, or instructions.

For example, the data processing device embodied by hardware may include, for example, a microprocessor, a CPU, a processor core, a multicore processor, a multiprocessor, an application-specific integrated circuit (ASIC), and a field-programmable gate array (FPGA).

The processor 251 transmits, through the antenna elements 210, the first transmission signal and/or the second transmission signal by setting an SINR to be 0 dB which is equal to an average power of an OFDM channel band using a guard band.

The processor 251 monitors an unoccupied frequency band of the receiving array antenna system 200 and a bandwidth, through the first transmission signal. Herein, the bandwidth may indicate a bandwidth of the unoccupied frequency band of the receiving array antenna system 200.

The processor 251 determines a PN code length and a chip rate based on a center frequency of the unoccupied frequency band and the bandwidth. For example, the processor 251 may determine, to be the chip rate, at least one OFDM channel bandwidth using a guard band included in the bandwidth. For example, the processor 251 may determine, to be the chip rate, a difference between an allocated 20 MHz bandwidth of an 802.11 OFDM signal and an occupied 16.6 MHz bandwidth. The processor 251 transmits the PN code length and the chip rate to the transmitting antenna device 100 through the antenna elements 210.

The processor 251 calculates a magnitude of a signal received by each of the antenna elements 210 and a phase difference using the first transmission signal and the second transmission signal. The processor 251 generates a calibration matrix based on the calculated signal magnitude and phase difference to calibrate the antenna elements 210.

The processor 251 performs digital down-conversion on the first transmission signal and/or the second transmission signal to convert the frequency band and the bandwidth to a baseband. The processor 251 generates a correlation value using a first transmission signal and a second transmission signal which are obtained through the digital down-conversion.

The processor 251 calculates the signal magnitude and the phase difference for each of the antenna elements 210 based on the generated correlation value.

When the bandwidth of the unoccupied frequency band is greater than or equal to a second threshold value, the processor 251 calculates steering vectors corresponding to line of sight (LoS) transmission based on a signal received at a point on an LoS path in a delay time domain of the second transmission signal. The LoS path may indicate a path having a greatest magnitude of the second transmission signal and a shortest arrival time of the second transmission signal, in the delay time domain of the second transmission signal. The processor 251 calculates the signal magnitude and the phase difference for each of the antenna elements 210 based on the calculated steering vectors.

When the bandwidth of the unoccupied frequency band is less than the second threshold value, the processor 251 estimates the number of multipath for the second transmission signal. The processor 251 calculates eigenvectors formed in a transmission direction of the second transmission signal based on the estimated number of the multipath. The processor 251 calculates the signal magnitude and the phase difference for each of the antenna elements 210 based on the calculated eigenvectors.

The processor 251 generates a calibration matrix for an antenna element that has a phase difference being greater than or equal to a first threshold value among the antenna elements 210, based on the signal magnitude and the phase difference calculated for each of the antenna elements 210. For example, the processor 251 selects the antenna element having the phase difference being greater than or equal to the first threshold value from among the antenna elements 210. The processor 251 generates the calibration matrix for the selected antenna element based on a magnitude of a signal received by the selected antenna element and a phase difference of the signal.

The processor 251 performs calibration and phase compensation on the antenna elements 210 based on the generated calibration matrix.

The memory 255 may include a volatile and/or nonvolatile memory. The memory 255 may store instructions and/or data associated with at least one of other components of the calibration device 250.

The memory 255 may store software and/or a program. For example, the memory 255 may store an application and software for the calibration and the phase compensation for the antenna elements 210.

Figure 3:
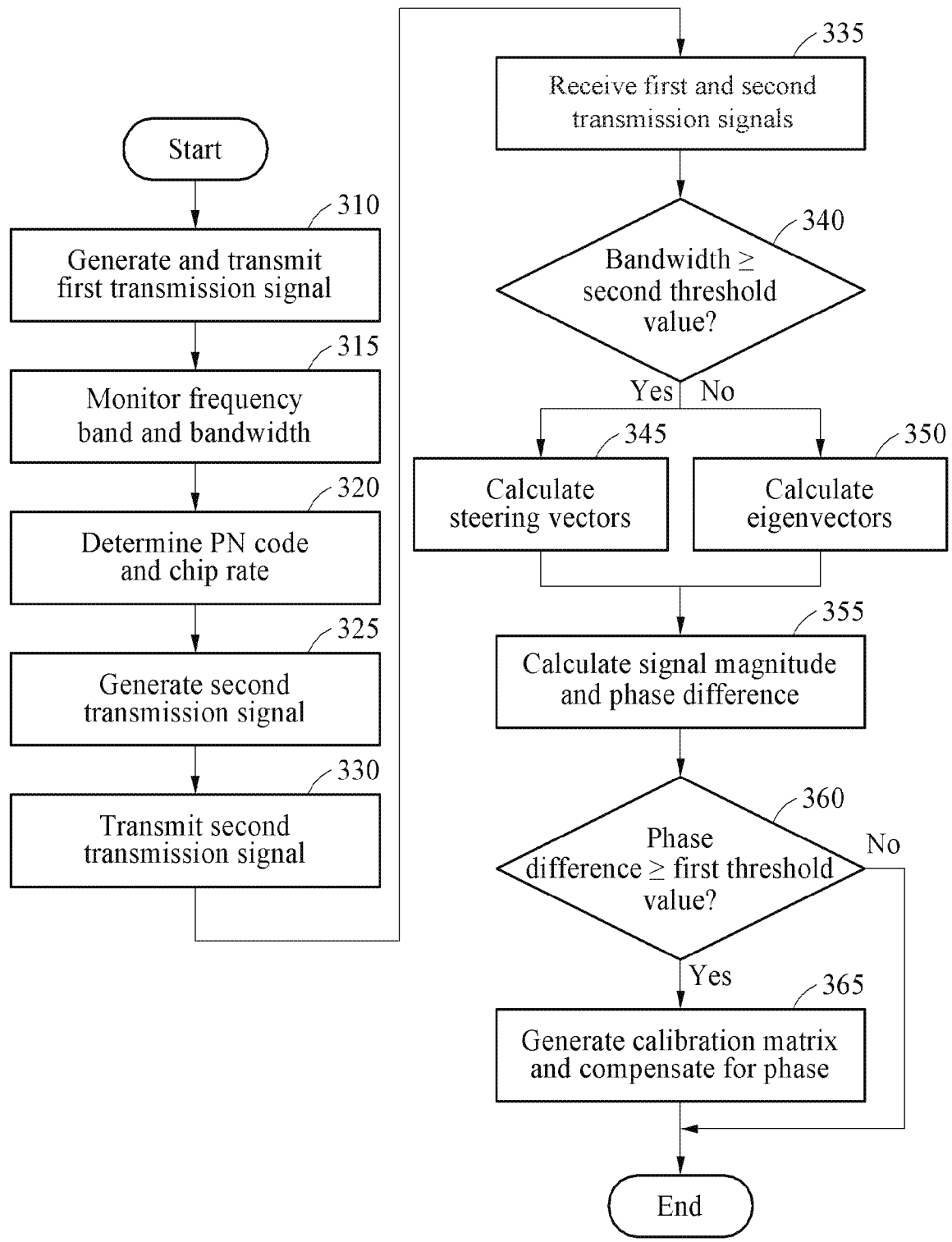
FIG. 3 is a flowchart illustrating an example of an operation to be performed by a communication system according to an example embodiment.

FIG. 3 is a flowchart illustrating an example of an operation to be performed by a communication system according to an example embodiment.

Referring to FIG. 3, in operation 310, the transmitting antenna device 100 generates and transmits a first transmission signal.

In operation 315, the transmitting antenna device 100 monitors an unoccupied frequency band in an operating frequency band of the receiving array antenna system 200, and a bandwidth.

In operation 320, the transmitting antenna device 100 determines a PN code length and a chip rate based on a center frequency of the unoccupied frequency band and the bandwidth.

In operation 325, the transmitting antenna device 100 generates a second transmission signal based on the determined PN code length and the determined chip rate. In operation 330, the transmitting antenna device 100 transmits the generated second transmission signal to the receiving array antenna system 200.

In operation 335, the receiving array antenna system 200 receives the first transmission signal and the second transmission signal.

In operation 340, the receiving array antenna system 200 determines whether the bandwidth of the unoccupied frequency band is greater than or equal to a second threshold value.

In operation 345, when the bandwidth is greater than or equal to the second threshold value, the receiving array antenna system 200 calculates steering vectors corresponding to LoS transmission based on a signal received at a point on an LoS path in a delay time domain of the second transmission signal. Through this, the receiving array antenna system 200 may solve an issue of degradation of calibration accuracy that may occur due to multipath.

When the bandwidth is less than the second threshold value, the receiving array antenna system 200 estimates the number of multipath for the second transmission signal. In operation 350, the receiving array antenna system 200 calculates eigenvectors formed in a transmission direction of the second transmission signal based on the estimated number of multipath.

In operation 355, the receiving array antenna system 200 calculates a signal magnitude and a phase difference for each of the antenna elements 210 based on the steering vectors and the eigenvectors.

In operation 360, the receiving array antenna system 200 determines whether the phase difference calculated for each of the antenna elements 210 is greater than or equal to a first threshold value.

In operation 365, the receiving array antenna system 200 generates a calibration matrix for an antenna element having a phase difference being greater than or equal to the first threshold value among the antenna elements 210 based on the signal magnitude and the phase difference calculated for each of the antenna elements 210. In operation 365, the receiving array antenna system 200 performs calibration and phase compensation on the antenna elements 210 based on the generated calibration matrix.

Figure 4:
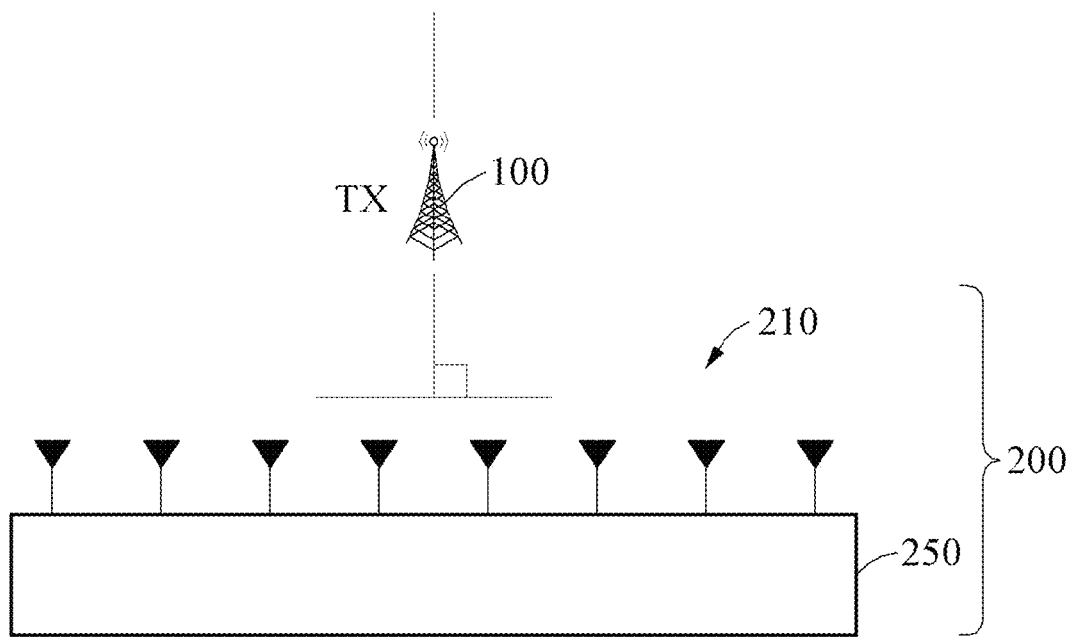
FIG. 4 is a diagram illustrating an example of a receiving array antenna system located on a path perpendicular to a transmitting antenna device according to an example embodiment.
Figure 5:
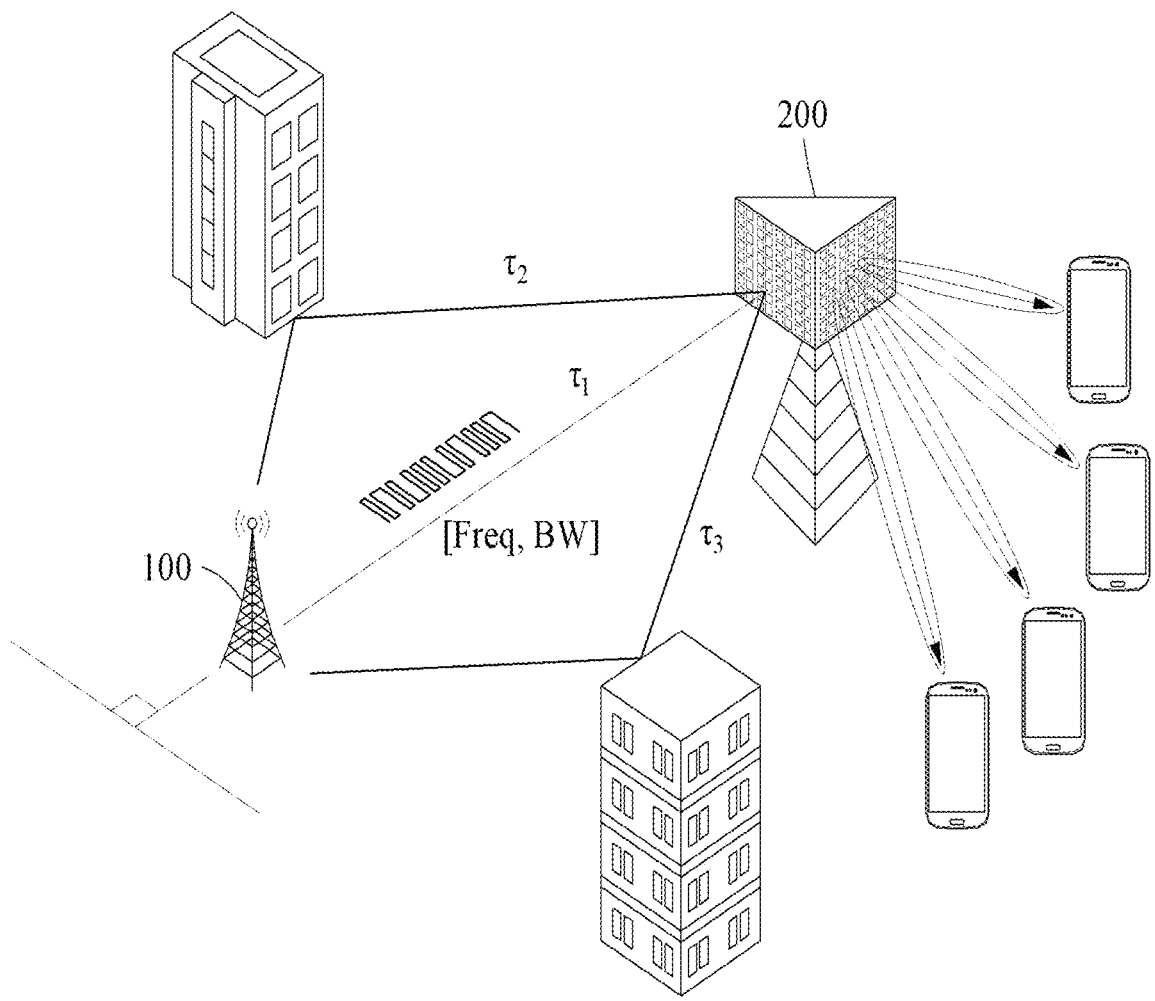
FIG. 5 is a diagram illustrating an example of a signal being transmitted through multipath from a transmitting antenna device.
Figure 6:
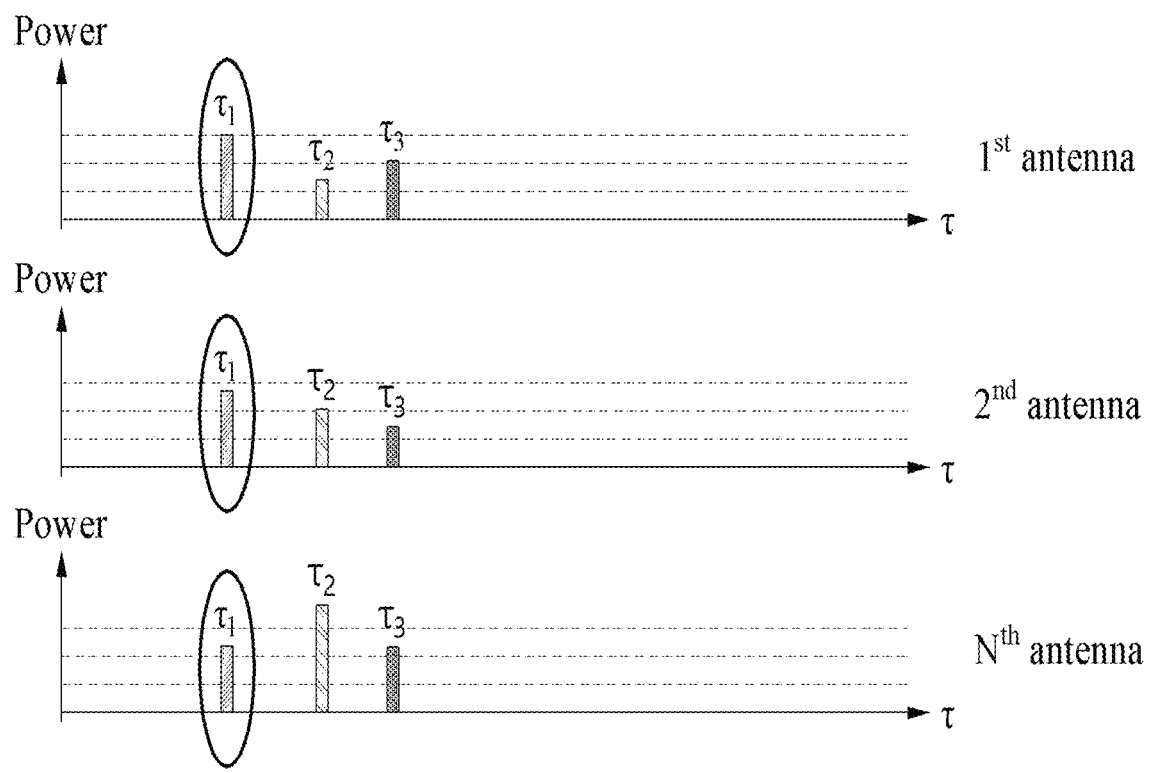
FIG. 6 is a diagram illustrating an example of how a receiving array antenna system selects a line of sight (LoS) peak point in a multipath environment according to an example embodiment.

FIG. 4 is a diagram illustrating an example of a receiving array antenna system located on a path perpendicular to a transmitting antenna device according to an example embodiment. FIG. 5 is a diagram illustrating an example of a signal being transmitted through multipath from a transmitting antenna device according to an example embodiment. FIG. 6 is a diagram illustrating an example of how a receiving array antenna system selects an LoS peak point in a multipath environment according to an example embodiment.

When the communication system 10 is embodied in an existing linear array antenna system, the receiving array antenna system 200 may form a path perpendicular to the transmitting antenna device 100. Thus, the communication system 10 may be structurally simplified or streamlined. That is, as the receiving array antenna system 200 forms the path perpendicular to the transmitting antenna device 100, it is possible to use a characteristic that all phase values of signals to be received by antenna elements 210 are the same.

To embody or include the communication system 10 in the existing linear array antenna system, an additional signal processing device may need to be included in the array antenna system for on-air calibration. The existing linear array antenna system may include a baseband signal processing structure through digital down-conversion. That is, the communication system 10 may calculate a signal magnitude and a phase difference for each of the antenna elements 210 simply by adding a function of a correlation between a PN code and a received signal.

Referring to FIG. 5, when the communication system 10 is embodied in a large array antenna system for LTE and 5G, for example, a multipath phenomenon, for example, $\tau_1$, $\tau_2$, and $T_3$, may occur to a transmission signal transmitted by the transmitting antenna device 100 in a complex on-air environment such as a downtown area. In case of occurrence of such multipath phenomenon, accuracy in calibration of the antenna elements 210 may be affected thereby. Thus, the receiving array antenna system 200 may select an LoS peak point and generate a PN code through a method to be described hereinafter with reference to FIG. 6.

The communication system 10 may be used to solve such issue of multipath reception of an on-air test type. The communication system 10 may perform calibration on the antenna elements 210 without suspending an operation of the array antenna system in operation. Thus, the communication system 10 may not require complex internal calibration using an IBF function in the existing linear array antenna system, and duplicated or redundant calibration such as calibration of an external environment.

Figure 7:
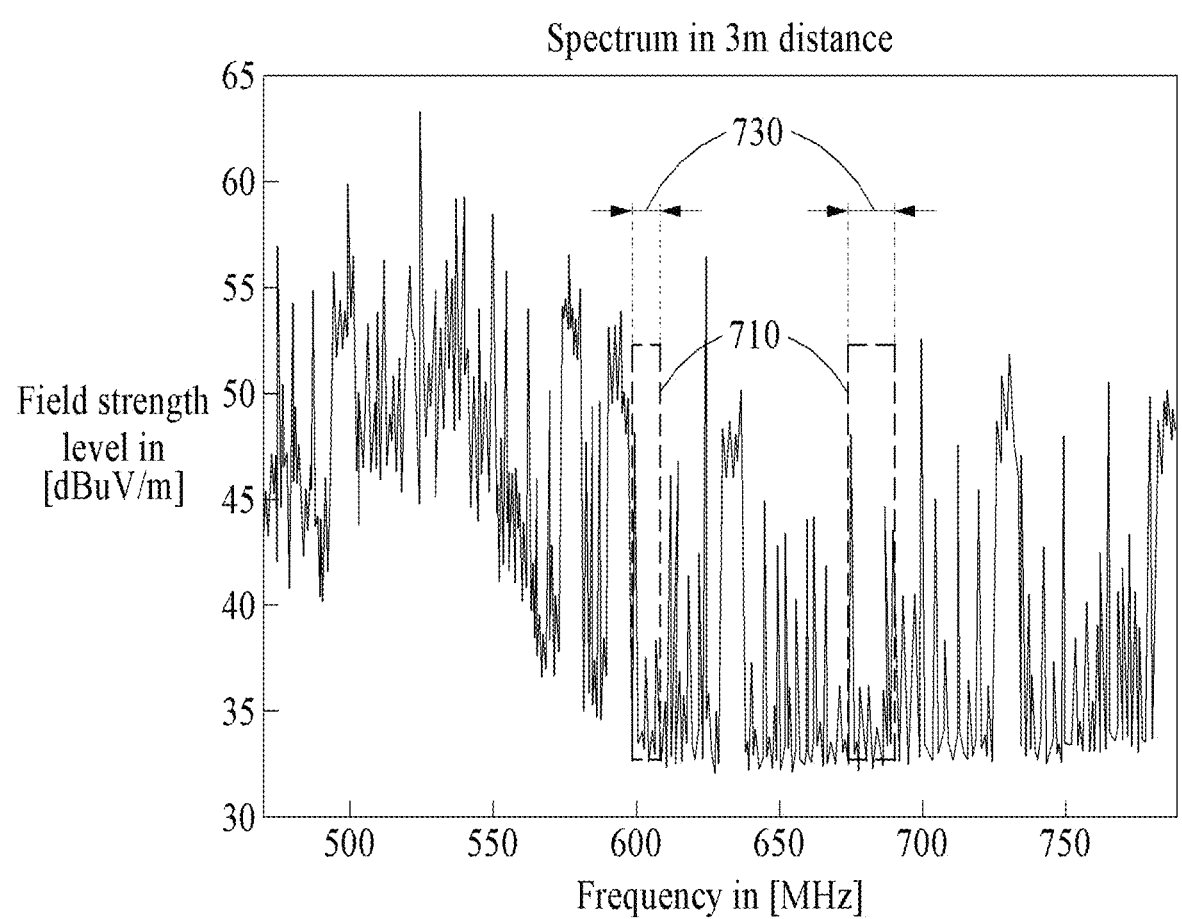
FIGS. 7 and 8 are diagrams illustrating examples of how a receiving array antenna system determines a pseudo noise (PN) code and a chip rate according to an example embodiment.
Figure 8:
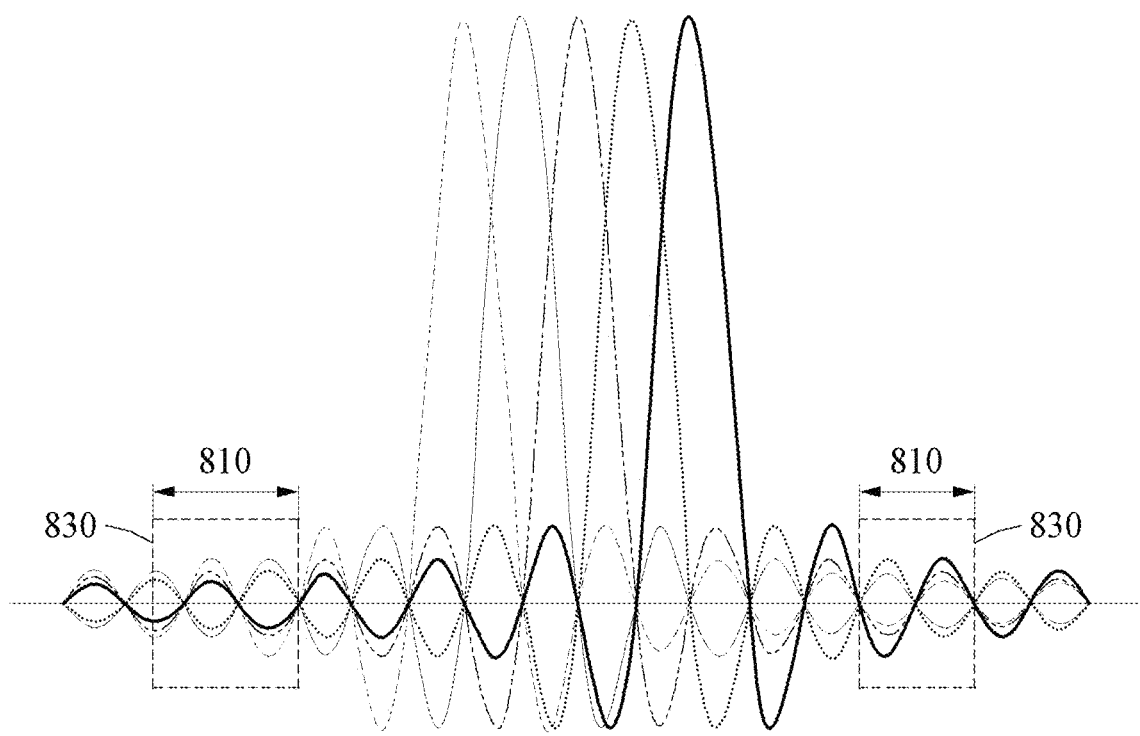

FIGS. 7 and 8 are diagrams illustrating examples of how a receiving array antenna system determines a PN code and a chip rate according to an example embodiment.

FIG. 7 illustrates a general frequency band used in a very- or ultra-high frequency (VHF or UHF) band. The receiving array antenna system 200 monitors a current situation of a currently occupied frequency band and determines an unoccupied frequency band 710 and a bandwidth 730. The receiving array antenna system 200 generates a PN code and a chip rate based on the unoccupied frequency band 710 and the bandwidth 730 and transmits the PN code and the chip rate to the transmitting antenna device 100.

Since only noise is present in the unoccupied frequency band 710 and the bandwidth 730, the receiving array antenna system 200 sets an SINR of a signal to be transmitted to be less than or equal to 0 dB. The receiving array antenna system 200 monitors a current situation of frequency usage and determines an available cumulative time of a first signal. The receiving array antenna system 200 repeatedly transmits and receives the first signal until the cumulative time arrives to improve the SINR.

Referring to FIG. 8, when the communication system 10 is embodied in a large array system used for LTE or 5G, for example, the receiving array antenna system 200 sets, to be a chip rate, a single OFDM channel bandwidth or multiple OFDM channel bandwidths using a guard band 830 in a channel bandwidth 810.

An OFDM type signal in the guard band 830 may correspond to an interference signal having various sidelobe powers of OFDM signals in an occupied channel bandwidth used for actual communication. Thus, the receiving array antenna system 200 may set a power of a signal to be transmitted to have an SINR of 0 dB that is equal to an average power of an OFDM guard band, and transmit the signal.

The receiving array antenna system 200 uses the guard band 830 that is not used in the frequency band, and thus may not affect a currently operating system and another neighboring OFDM system, for example, another LTE or 5G system.

Figure 9:
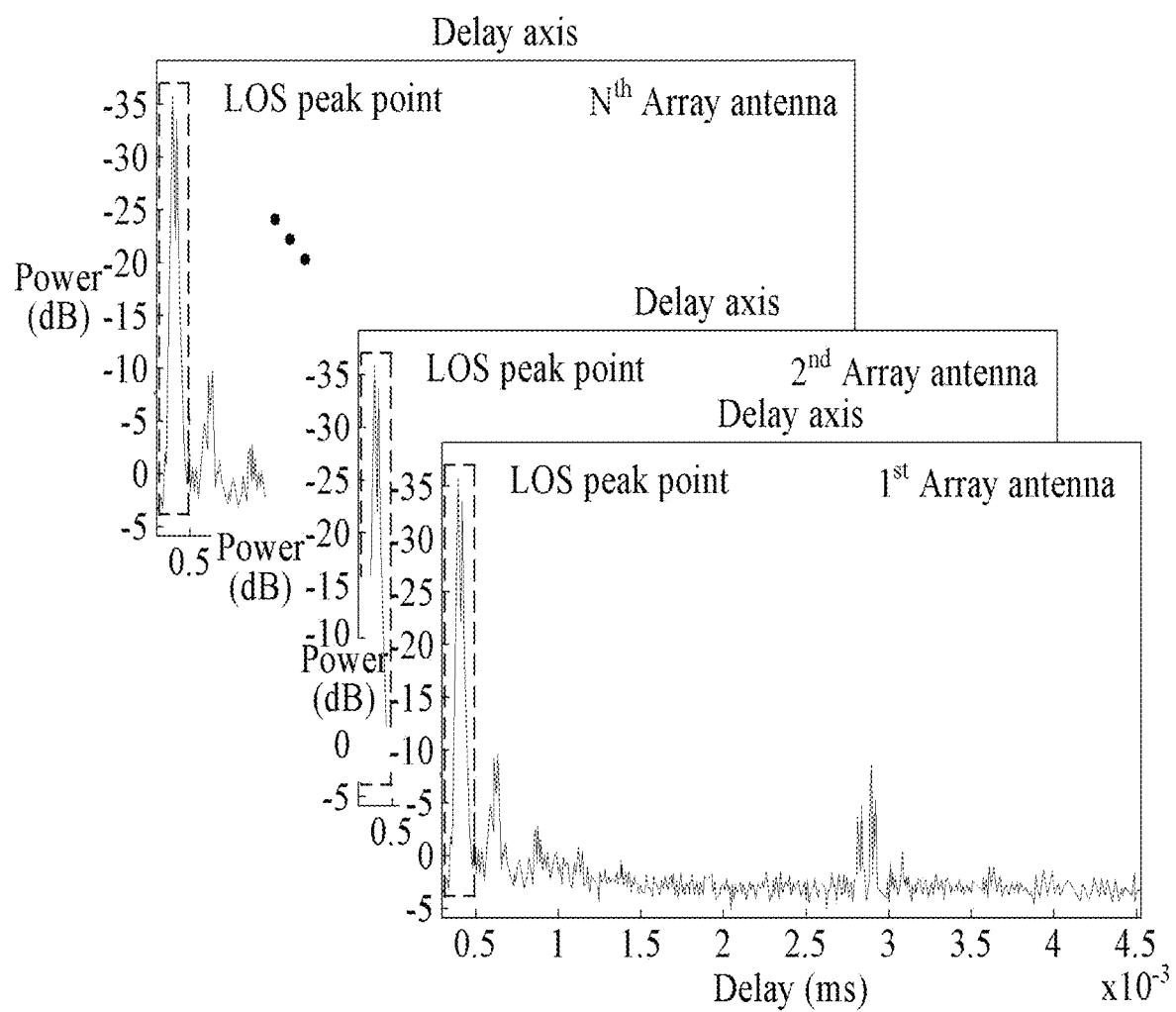
FIG. 9 is a diagram illustrating an example of how a receiving array antenna system selects an LoS peak in a multipath environment and processes a signal according to an example embodiment.

FIG. 9 is a diagram illustrating an example of how a receiving array antenna system selects an LoS peak in a multipath environment and processes a signal according to an example embodiment.

When a bandwidth of an unoccupied frequency band is greater than or equal to a second threshold value, the receiving array antenna system 200 outputs a result of performing a correlation on a first transmission signal and a second transmission signal into a delay time domain as illustrated in FIG. 8.

Based on the correlation result output by the receiving array antenna system 200 into the delay time domain, there is actual multipath in addition to an LoS path. In addition, the receiving array antenna system 200 outputs a matrix result, for example, a result of [delay time–magnitude/phase], with respect to the delay time domain, for each of the antenna elements 210.

The receiving array antenna system 200 outputs, in the form of a matrix, a signal magnitude and phase information which are estimated through the LoS path in the delay time domain. Based on the matrix, respective signal magnitudes and phases of the antenna elements 210 may be identical to each other. The receiving array antenna system 200 may discover an antenna element for which a phase difference between neighboring matrix vectors in the matrix is greater than or equal to a first threshold value, and perform calibration and phase compensation adaptive to an actual environment.

Figure 10:
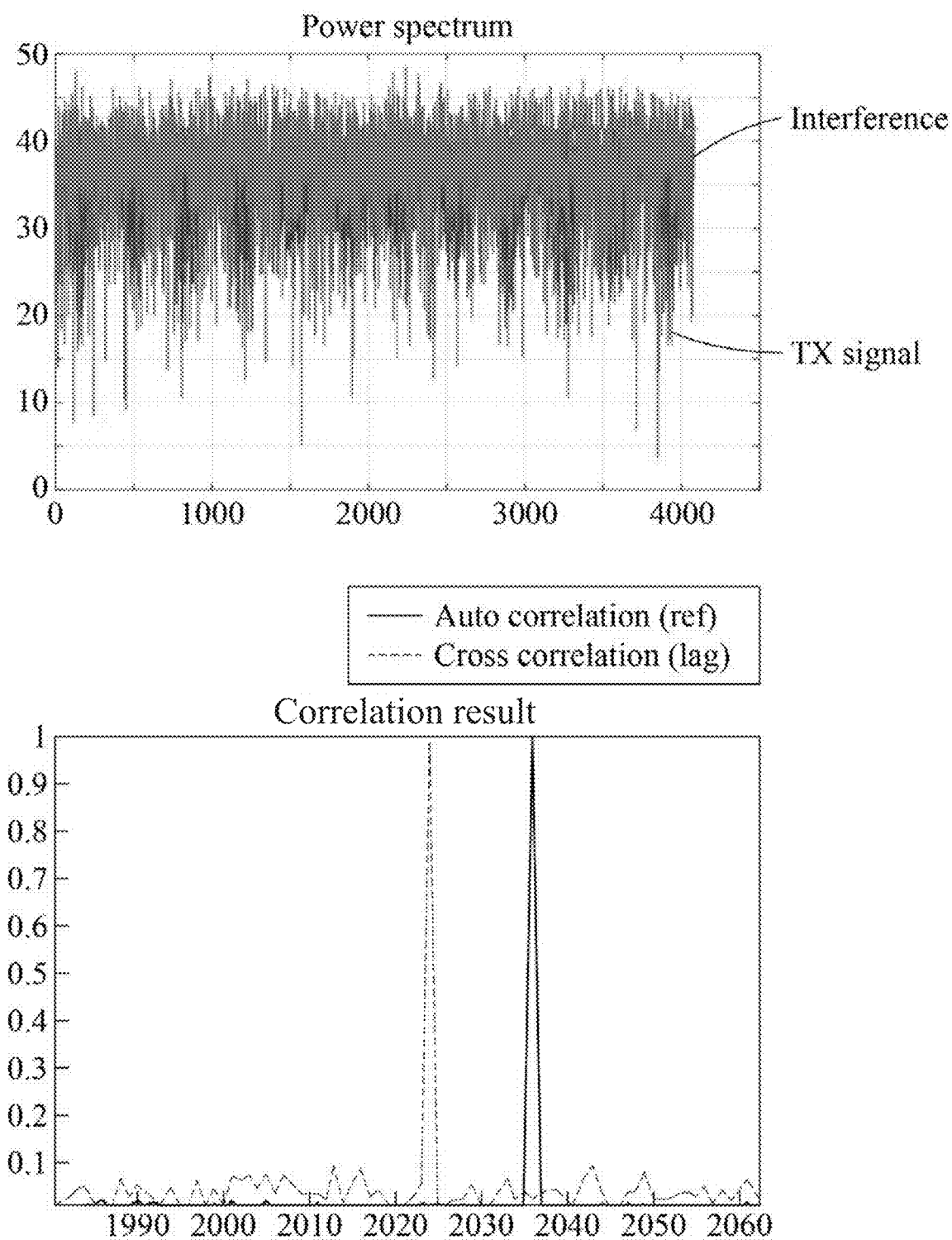
FIG. 10 is a diagram illustrating an example of how a receiving array antenna system outputs a phase delay representation in a delay time domain according to an example embodiment.

FIG. 10 is a diagram illustrating an example of how a receiving array antenna system outputs a phase delay representation in a delay time domain according to an example embodiment.

The receiving array antenna system 200 sets a power of a second transmission signal to be a power less than or equal to −10 dB compared to noise power, with respect to an unoccupied frequency band in a VHF or UHF band, and transmit the signal with the set power.

The receiving array antenna system 200 accurately outputs a phase delay representation in a delay time domain by securing an SINR having a sufficient result value obtained after a correlation process is performed on the signal. As illustrated in FIG. 10, the receiving array antenna system 200 outputs a power spectrum that is not visible because the second transmission signal is actually less than the noise power.

Figure 11:
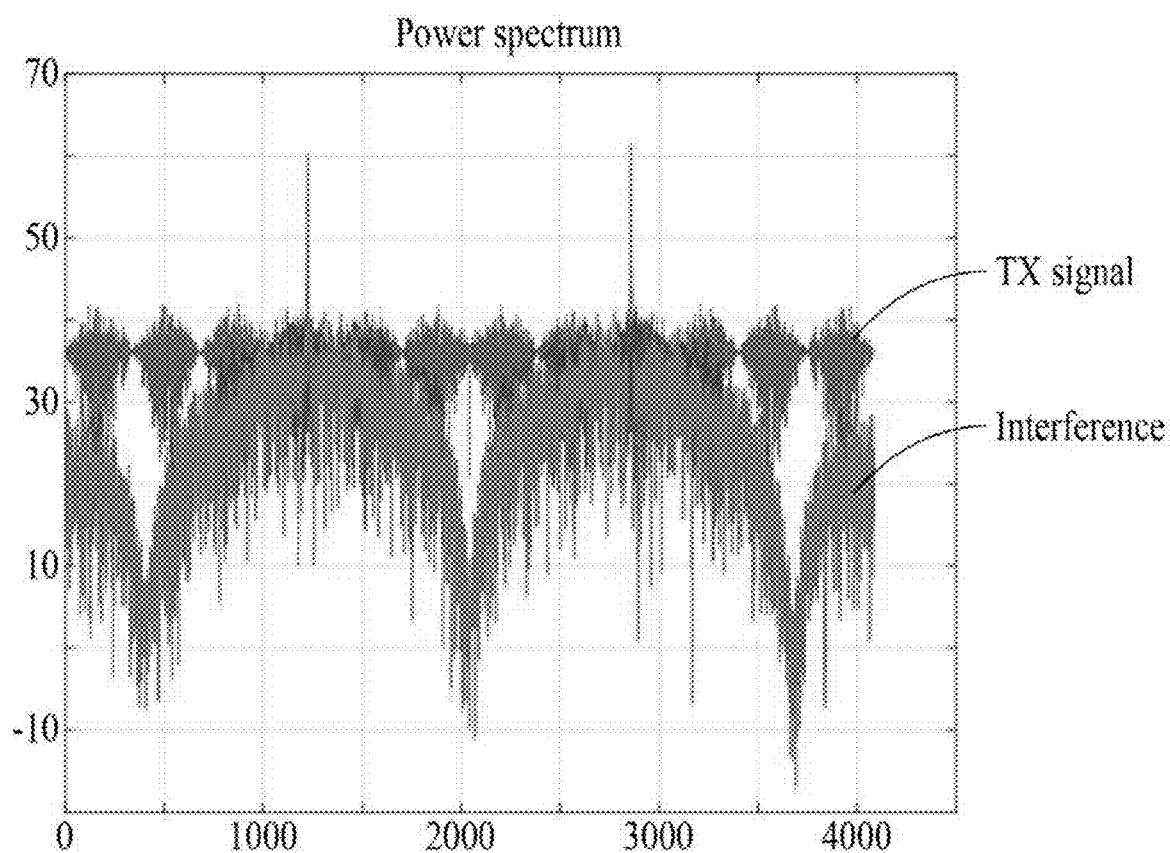
FIGS. 11 and 12 are diagrams illustrating power spectrums obtained when a receiving array antenna system transmits a signal with respect to a guard band according to an example embodiment.
Figure 12:
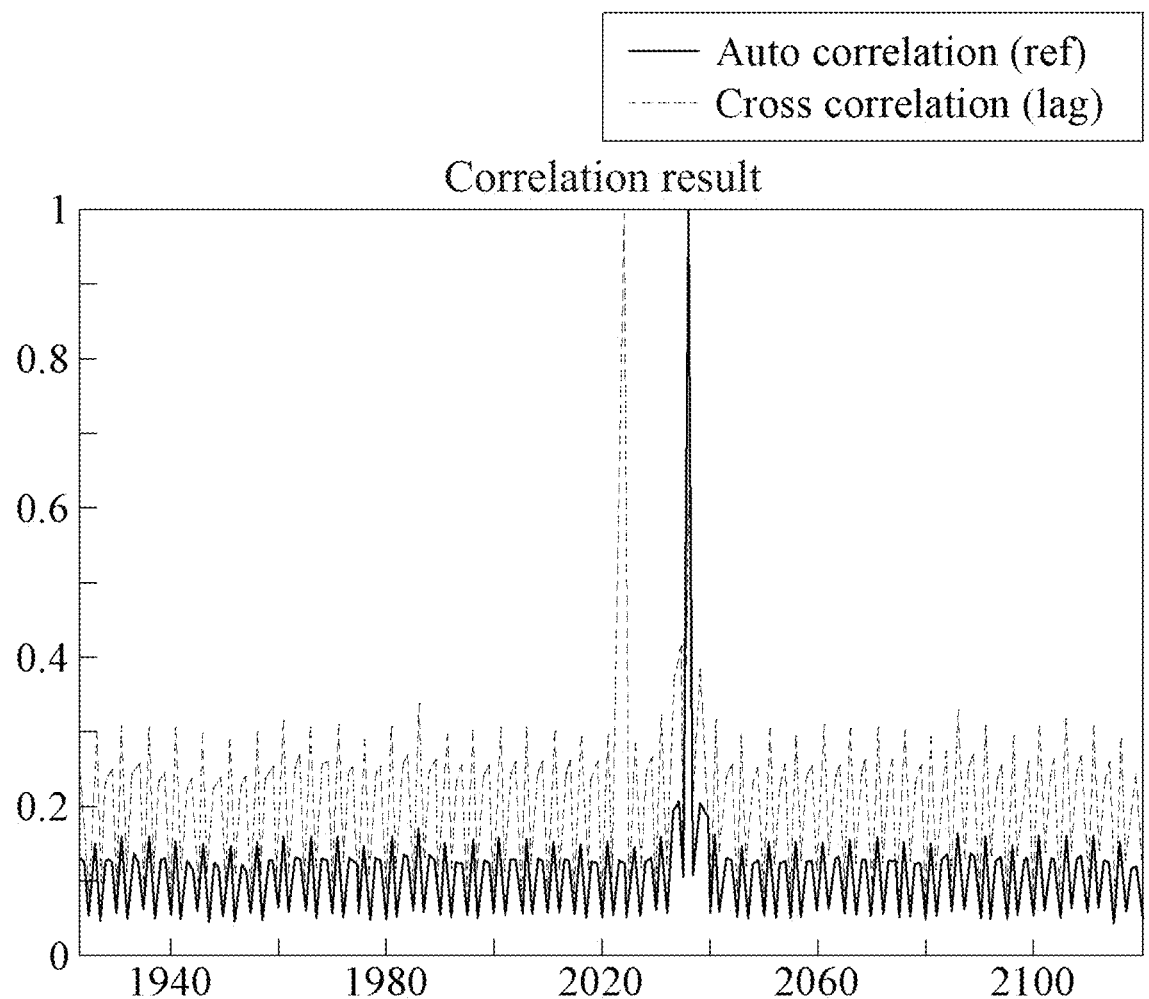

FIGS. 11 and 12 are diagrams illustrating power spectrums obtained when a receiving array antenna system transmits a signal with respect to a guard band according to an example embodiment.

When a signal with an SINR being 0 dB for a band in a guard band is transmitted through an OFDM transmission method, the receiving array antenna system 200 outputs a power spectrum illustrated in FIG. 11.

FIG. 12 illustrates a correlation result obtained by processing a correlation using a first transmission signal and a second transmission signal by the receiving array antenna system 200. Based on the correlation result, a delayed phase may be accurately measured for each of the antenna elements 210.

For example, such simulation result illustrated in FIG. 12 may be a result obtained when the receiving array antenna system 200 transmits a PN code once, not a result obtained when the receiving array antenna system 200 transmits a PN code continuously and repeatedly. Thus, when the receiving array antenna system 200 transmits and receives a first signal repeatedly until an available cumulative time arrives, and results therefrom are accumulated, an SINR may increase greatly, and thus calibration accuracy may be improved.

Figure 14:
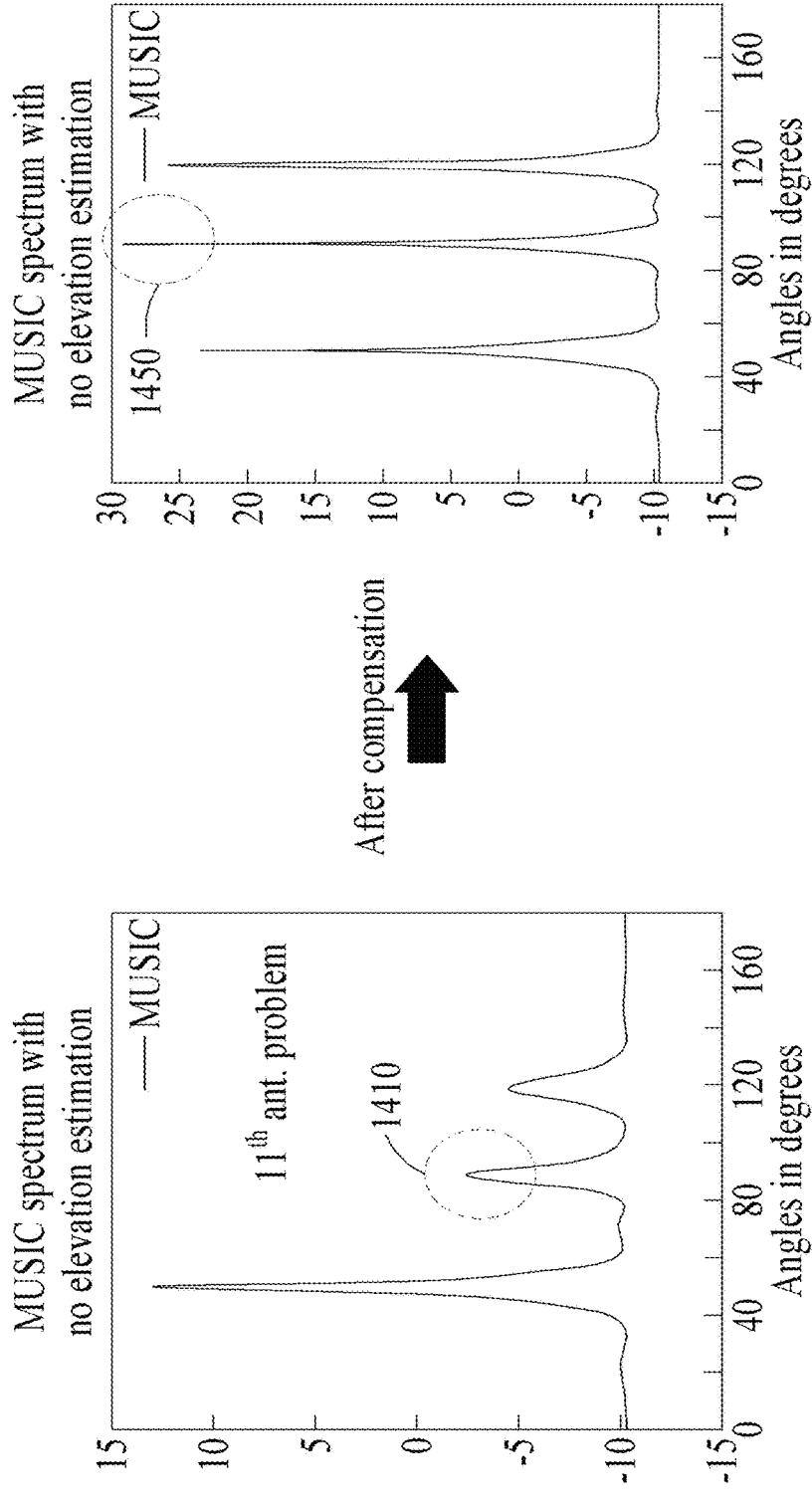
FIG. 14 is a diagram illustrating an example of a result obtained when a receiving array antenna system performs phase compensation according to an example embodiment.

FIG. 13 is a diagram illustrating an example of how a receiving array antenna system estimates the number of multipath according to an example embodiment. FIG. 14 is a diagram illustrating an example of a result obtained when a receiving array antenna system performs phase compensation according to an example embodiment.

When a bandwidth of an unoccupied frequency band is less than a threshold value, the receiving array antenna system 200 may more accurately estimate the number of multipath by compensating a failure of an existing multiple signal classification (MUSIC) algorithm in estimating the multipath.

That is, when the number of the antenna elements 210 is greater than the number of multipath, the receiving array antenna system 200 may set a noise subspace to be sufficiently smaller than an ideal value. By setting the noise subspace to be sufficiently smaller than the ideal value by the receiving array antenna system 200, it is possible to accurately estimate the number of multipath, although a gain effect may be reduced.

The receiving array antenna system 200 may extract an eigenvector corresponding to a receiving angle of 90 degrees (°) using the existing MUSIC algorithm after estimating the number of multipath. The receiving array antenna system 200 may generate a calibration matrix to calibrate the antenna elements 210 by comparing the eigenvector to an initial calibration matrix for the antenna elements 210. The receiving array antenna system 200 may perform phase compensation based on the generated calibration matrix.

For example, referring to FIG. 14, the receiving array antenna system 200 detects occurrence of an abnormality in an 11th antenna as indicated by reference numeral 1410. The receiving array antenna system 200 performs phase compensation based on a calibration matrix generated for the 11th antenna in which the abnormality occurs as indicated by reference numeral 1450.

The communication system 10 may detect such abnormality or failure of antenna elements included in an array antenna system that is actually in operation, and perform calibration for the detected abnormality or failure. The communication system 100 may be provided in a simple structure and may perform an on-air test method that is variously applied while the system is operating. In addition, the communication system 10 may be used to solve an issue of degradation of accuracy in calibration that may occur due to a multipath phenomenon which is a disadvantage of the on-air test method.

The communication system 10 may transmit a first transmission signal which is a test signal with respect to an unoccupied frequency band and a bandwidth of the frequency band, and transmit a second transmission signal with a transmission power less than noise power and side-lobe power. Thus, it may not affect the performance of the array antenna system in operation and other neighboring array antenna systems.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of calibrating a phased array antenna system, comprising:
   receiving a first transmission signal transmitted from a transmitting antenna device;
   receiving a second transmission signal that is generated by the transmitting antenna device based on an unoccupied frequency band of a receiving array antenna system and a bandwidth of the frequency band;
   generating a calibration matrix to calibrate a plurality of antenna elements included in the receiving array antenna system based on a signal magnitude and a phase difference which are calculated for each of the antenna elements using the first transmission signal and the second transmission signal, and
   determining a pseudo noise (PN) code length and a chip rate based on a center frequency of the frequency band and the bandwidth; and
   generating the second transmission signal based on the determined PN code length and the determined chip rate.

2. The method of claim 1, wherein the receiving comprises:
   receiving the first transmission signal and the second transmission signal at an incidence angle perpendicular to a receiving azimuth angle of the antenna elements.

3. The method of claim 1, further comprising:
   monitoring the center frequency of the frequency band and the bandwidth.

4. The method of claim 1, wherein the determining of the PN code length and the chip rate comprises:
   determining, to be the chip rate, at least one orthogonal frequency-division multiplexing (OFDM) channel bandwidth using a guard band included in the bandwidth.

5. The method of claim 4, wherein the first transmission signal and the second transmission signal are signals for which a signal-to-interference-plus-noise ratio (SINR) is set to be 0 decibels (dB) equal to an average power of an OFDM channel band using the guard band and to be transmitted.

6. The method of claim 1, wherein the generating comprises:
   performing digital down-conversion on the first transmission signal and the second transmission signal to convert the frequency band and the bandwidth to a baseband;

generating a correlation value using a first transmission signal and a second transmission signal which are obtained through the digital down-conversion;

calculating the signal magnitude and the phase difference for each of the antenna elements based on the generated correlation value; and generating the calibration matrix for an antenna element having a phase difference being greater than or equal to a first threshold value among the antenna elements based on the calculated signal magnitude and phase difference.

7. The method of claim 6, wherein the calculating of the signal magnitude and the phase difference comprises:

when the bandwidth is greater than or equal to a second threshold value, calculating steering vectors corresponding to line of sight (LoS) transmission based on a signal received at a point on an LoS path in a delay time domain of the second transmission signal; and calculating the signal magnitude and the phase difference based on the calculated steering vectors.

8. The method of claim 7, wherein the LoS path is a path having a greatest magnitude of the second transmission signal and a shortest arrival time of the second transmission signal in the delay time domain of the second transmission signal.

9. The method of claim 6, wherein the calculating of the signal magnitude and the phase difference comprises:

when the bandwidth is less than the second threshold value, estimating the number of multipath for the second transmission signal;

calculating eigenvectors formed in a transmission direction of the second transmission signal based on the number of the multipath; and calculating the signal magnitude and the phase difference based on the calculated eigenvectors.

10. An apparatus for calibrating a phased array antenna system, comprising:

a memory configured to store instructions for calibrating the phased array antenna system; and a processor configured to execute the instructions, wherein, when the instructions are executed by the processor, the processor is configured to:

receive a first transmission signal transmitted from a transmitting antenna device;

receive a second transmission signal that is generated by the transmitting antenna device based on an unoccupied frequency band of a receiving array antenna system and a bandwidth of the frequency band; and generate a calibration matrix to calibrate a plurality of antenna elements included in the receiving array antenna system based on a signal magnitude and a phase difference which are calculated for each of the antenna elements using the first transmission signal and the second transmission signal, and wherein the processor is further configured to:

determine a pseudo noise (PN) code length and a chip rate based on a center frequency of the frequency band and the bandwidth; and generate the second transmission signal based on the determined PN code length and the determined chip rate.

11. The apparatus of claim 10, wherein the processor is configured to receive the first transmission signal and the second transmission signal at an incidence angle perpendicular to a receiving azimuth angle of the antenna elements.

12. The apparatus of claim 10, wherein the processor is configured to monitor the center frequency of the frequency band and the bandwidth.

13. The apparatus of claim 10, wherein the processor is configured to determine, to be the chip rate, at least one orthogonal frequency-division multiplexing (OFDM) channel bandwidth using a guard band included in the bandwidth.

14. The apparatus of claim 13, wherein the first transmission signal and the second transmissions signal are signals for which a signal-to-interference-plus-noise ratio (SINR) is set to be 0 decibels (dB) equal to an average power of an OFDM channel band using the guard band and to be transmitted.

15. The apparatus of claim 10, wherein the processor is configured to:

perform digital down-conversion on the first transmission signal and the second transmission signal to convert the frequency band and the bandwidth to a baseband;

generate a correlation value using a first transmission signal and a second transmission signal which are obtained through the digital down-conversion;

calculate the signal magnitude and the phase difference for each of the antenna elements based on the generated correlation value; and generate the calibration matrix for an antenna element having a phase difference being greater than or equal to a first threshold value among the antenna elements based on the calculated signal magnitude and the calculated phase difference.

16. The apparatus of claim 15, wherein the processor is configured to:

when the bandwidth is greater than or equal to a second threshold value, calculate steering vectors corresponding to line of sight (LoS) transmission based on a signal received at a point on an LoS path in a delay time domain of the second transmission signal; and calculate the signal magnitude and the phase difference based on the calculated steering vectors.

17. The apparatus of claim 16, wherein the LoS path is a path having a greatest magnitude of the second transmission signal and a shortest arrival time of the second transmission signal in the delay time domain of the second transmission signal.

18. The apparatus of claim 15, wherein the processor is configured to:

when the bandwidth is less than a second threshold value, estimate the number of multipath for the second transmission signal;

calculate eigenvectors formed in a transmission direction of the second transmission signal based on the estimated number of the multipath; and calculate the signal magnitude and the phase difference based on the calculated eigenvectors.

* * * * *